(12) United States Patent
Botea et al.

(10) Patent No.: US 11,386,338 B2
(45) Date of Patent: Jul. 12, 2022

(54) INTEGRATING MULTIPLE DOMAIN PROBLEM SOLVING IN A DIALOG SYSTEM FOR A USER

(71) Applicant: INTERNATIONAL BUSINESS MACHINES CORPORATION, Armonk, NY (US)

(72) Inventors: Adi I. Botea, Dublin (IE); Oznur Alkan, Clonsilla (IE); Elizabeth Daly, Monkstown (IE); Matthew Davis, Cambridge, MA (US); Akihiro Kishimoto, Castleknock (IE); Vera Liao, White Plains, NY (US); Radu Marinescu, Castleknock (IE); Biplav Srivastava, Westchester, NY (US); Kartik Talamadupula, White Plains, NY (US); Yunfeng Zhang, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1042 days.

(21) Appl. No.: 16/028,136

(22) Filed: Jul. 5, 2018

(65) Prior Publication Data
US 2020/0012954 A1 Jan. 9, 2020

(51) Int. Cl.
*G06N 5/04* (2006.01)
*G10L 15/06* (2013.01)
*G06N 20/00* (2019.01)

(52) U.S. Cl.
CPC .............. *G06N 5/04* (2013.01); *G10L 15/063* (2013.01); *G06N 20/00* (2019.01); *G10L 2015/0631* (2013.01)

(58) Field of Classification Search
CPC ........ G06N 5/04; G06N 20/00; G10L 15/063; G10L 15/1822; G10L 2015/225; G10L 2015/0631; G06F 40/35
See application file for complete search history.

(56) References Cited

U.S. PATENT DOCUMENTS

| 5,948,040 A * | 9/1999 | DeLorme ............... G06Q 10/02 701/426 |
| 2011/0258543 A1 * | 10/2011 | Larsson .................. G06F 3/038 715/702 |
| 2012/0022857 A1 | 1/2012 | Baldwin et al. |
| 2015/0039316 A1 | 2/2015 | Tzirkel-Hancock et al. |
| 2016/0154788 A1 | 6/2016 | Di Fabbrizio et al. |
| 2017/0032689 A1 * | 2/2017 | Beason .................... G09B 7/00 |
| 2017/0337261 A1 | 11/2017 | Wang |
| 2018/0227418 A1 * | 8/2018 | Segalis ................. G06Q 10/10 |

* cited by examiner

*Primary Examiner* — Etienne P Leroux
(74) *Attorney, Agent, or Firm* — Griffiths & Seaton PLLC (57) ABSTRACT

Various embodiments are provided for integrating multiple domain learning and personalization in a dialog system for a user in a computing environment by a processor. One or more problem instances may be defined for multiple domains according to a problem instance template, identified user intent, links to one or more problem solvers associated with the multiple domains, or a combination thereof. A dialog plan may be determined to further define the one or more problem instances in response to user input. A solution may be provided to the user for the one or more problem instances.

20 Claims, 8 Drawing Sheets

INTEGRATING MULTIPLE DOMAIN PROBLEM SOLVING IN A DIALOG SYSTEM FOR A USER

BACKGROUND OF THE INVENTION

Field of the Invention

The present invention relates in general to computing systems, and more particularly, to various embodiments for integrating multiple domain problem solving in a dialog system for a user in a computing environment using a computing processor.

Description of the Related Art

In today's society, consumers, businesspersons, educators, and others communicate over a wide variety of mediums in real time, across great distances, and many times without boundaries or borders. The advent of computers and networking technologies have made possible the increase in the quality of life while enhancing day-to-day activities and simplifying the sharing of information.

Computing systems can include an Internet of Things (IoT), which is the interconnection of computing devices scattered across the globe using the existing Internet infrastructure. That is, IoT is based on the idea that everyday objects, not just computers and computer networks, can be readable, recognizable, locatable, addressable, and controllable via an IoT communications network (e.g., an ad-hoc system or the Internet). In other words, the IoT can refer to uniquely identifiable devices and their virtual representations in an Internet-like structure. As great strides and advances in technologies come to fruition, the greater the need to make progress in these systems advantageous for efficiency and improvement.

SUMMARY OF THE INVENTION

Various embodiments are provided for integrating multiple domain problem solving in a dialog system for a user in a computing environment by a processor. One or more problem instances may be defined for multiple domains according to a problem instance template, identified user intent, links to one or more problem solvers associated with the multiple domains, or a combination thereof. A dialog plan may be determined to further define the one or more problem instances in response to user input. A solution may be provided to the user for the one or more problem instances.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include computers, smartphones, laptops, home appliances, audio systems, televisions, security cameras, security sensors, among countless other examples. Such IoT computing systems may be employed in dialog systems, energy systems (e.g., energy grids), water networks, traffic networks, smart buildings, and the like.

For example, dialog systems can play a key role in the functioning of an organization, such as a business, government, group or other entity. For example, many critical decisions may result from discussions in chat systems, or chat-like conversation systems or chatbots. A chatbot may be an operation which conducts a dialog or conversation, audible, visual, and/or via textual methods. Organizations may seek to capture and analyze these decisions to make various improvements to a structure of the organization. However, current dialog systems are unable to provide dialog and problem-solving skills in multiple domains, helping the user solve a range of problems in various domains.

Thus, the present invention provides a computing system that integrates multiple domain problem solving in a dialog system for a user. In one aspect, a domain may be a knowledge domain or ontology. For example, various domain examples include, but are not limited to, a calendar management, career advice domain, trip/travel planning domain, a shopping domain, planning domain, an educational domain, and other various types of domains. A dialog system enables a user to specify problems, constraints and preferences through a natural dialog using the dialog system.

In one aspect, the present invention enables a dialog system (e.g., a chatbot) to identify a type of a problem of a user and to infer one or more details of the user's problem, invoking a solver operation, and presenting a solution to the user.

In an additional aspect, mechanisms of the illustrated embodiments provide a cognitive dialog system having knowledge or ontology about one or several domains (e.g., planning a trip, booking a meeting, ordering food), with the ability to add new domains in a modular fashion. The dialog system recognizes and identifies from the user input when the user needs to solve a problem from one of the domains available. A machine learning operation (e.g., artificial intelligence operation) leads and conducts a dialog with a user with an objective and ability of understanding all relevant details of the problem (e.g., who travels, from where to where, departure date, return date). A problem instance is built and generated, and a solver may be used to solve the problem. The solution may be provided to the user.

It should be noted as described herein, the term "cognitive" (or "cognition") may be relating to, being, or involving conscious intellectual activity such as, for example, thinking, reasoning, or remembering, that may be performed using machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more problems, domains, events, operations, or processes. Thus, the cognitive model may, over time, develop semantic labels to apply to observed behavior, domains, problems, and use a knowledge domain or ontology to store the learned observed behavior, problems, and domain. In one embodiment, the system provides for progressive levels of complexity in what may be learned from the one or more dialogs, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identifying problems, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
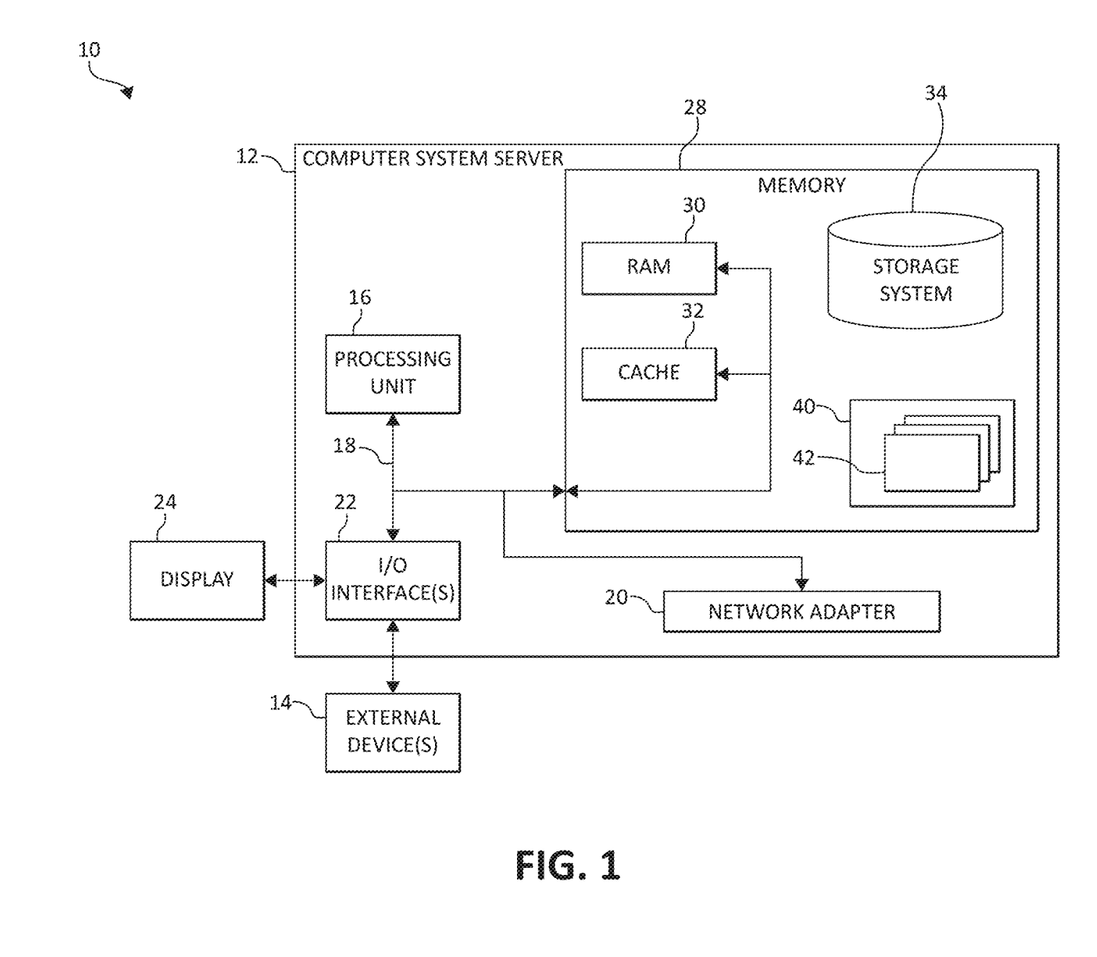
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
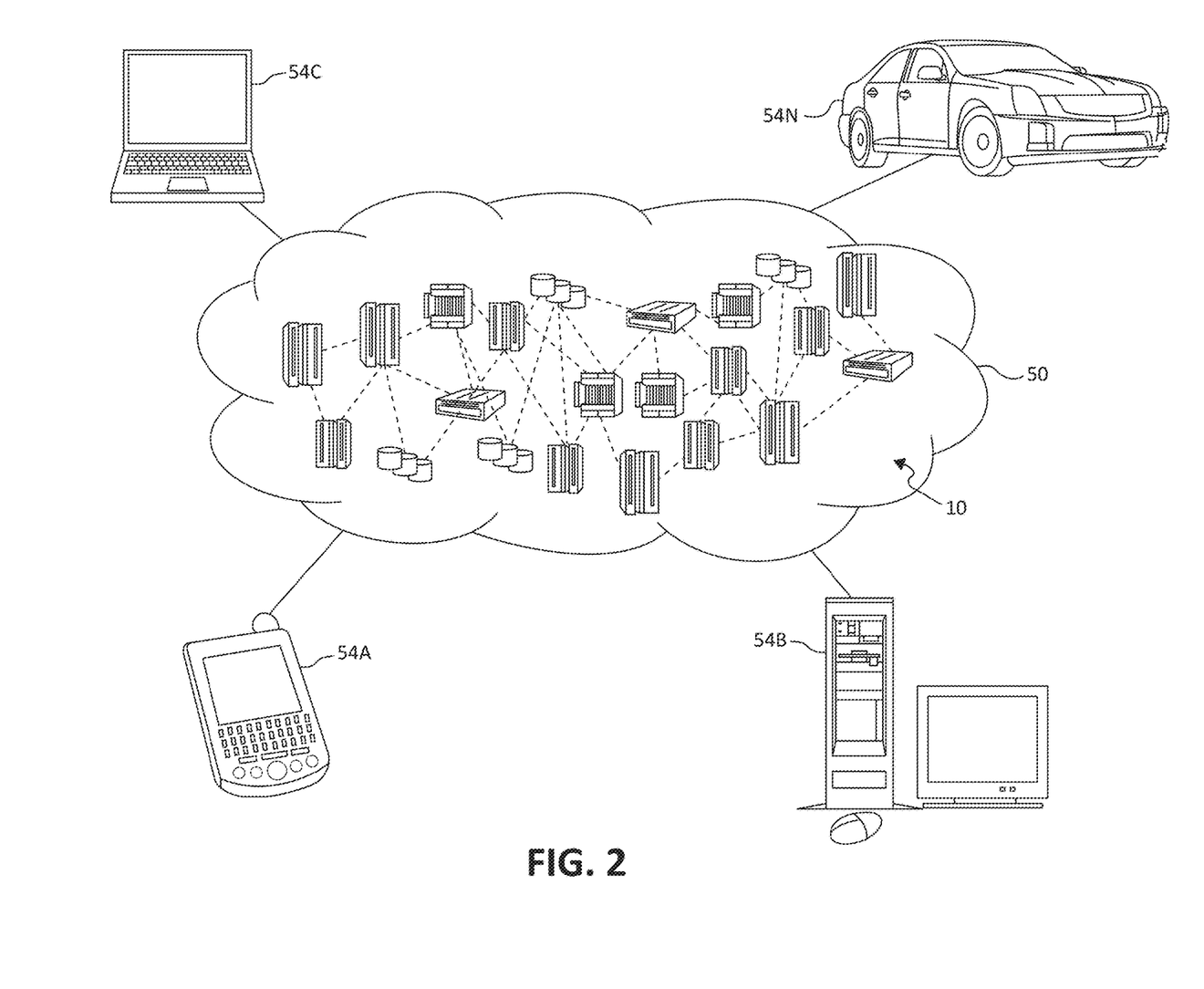
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or other type of computer systems 54N (e.g., an automobile computer system) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
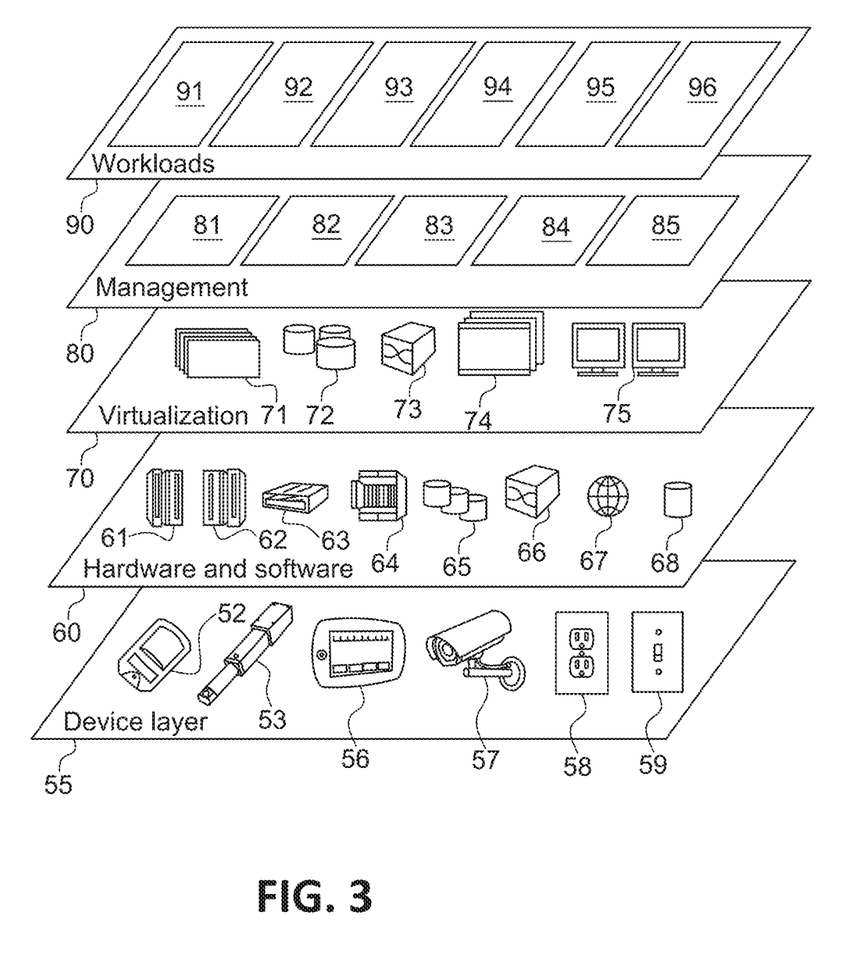
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for integrating multiple domain problem solving in a dialog system. In addition, the workloads and functions 96 for integrating multiple domain problem solving in a dialog system may include such operations as data analytics, data analysis, and as will be further described, notification functionality. One of ordinary skill in the art will appreciate that the workloads and functions 96 for integrating multiple domain problem solving in a dialog system may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for integrating multiple domain problem solving in a dialog system in a computing environment. In one aspect, the present invention provides for multiple domain problem solving through a dialog with a user via a dialog system, according to one or more settings. In setting 1, the domain is known, the problem is unknown, and action templates, plan templates and/or instance templates may be given or provided. In setting 2, a set of domains are given where each domain may have features summarized in setting 1 (e.g., dialog may be computed with a domain-independent planning engine). In setting 3, similar to setting 2, actions in the dialog may be computed with a domain-independent planning engine. In one aspect, the dialog system may include multiple domains that may be used. Natural language may be used to express templates. The dialog system may include a domain-independent planning engine to compute a dialog plan. The dialog system may also include a domain-independent conditional planning engine to compute the dialog plan accounting for known dialog uncertainty.

Figure 4:
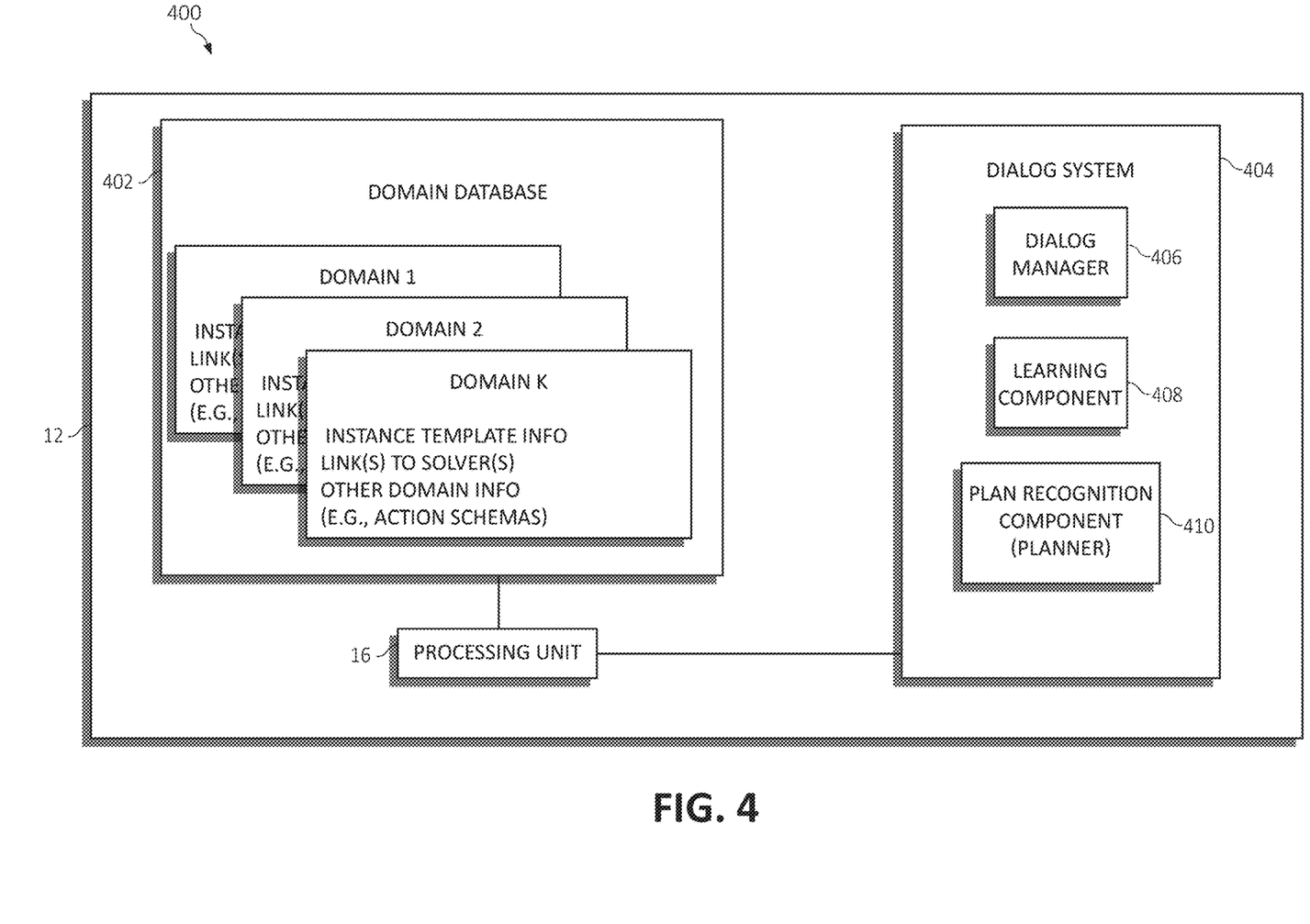
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates workloads and functions for integrating multiple domain problem solving in a dialog system for a user in a computing environment. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive domain problem solving in accordance with the present invention. Many of the functional blocks 400 may execute as background processes on various components, either in distributed computing components, or on the user device, or elsewhere. Computer system/server 12 is again shown, incorporating processing unit 16 (and memory 28 of FIG. 1—not shown for illustrative convenience) to perform various computational, data processing and other functionality in accordance with various aspects of the present invention.

The system 400 may include a domain database 402 and a dialog system 404. The dialog system 404 may include a dialog manager 406, a learning component 408, and a plan recognition component 410 (e.g., a planner). The system 400 is a system that integrates into a dialog system with the ability to solve problem instances in multiple domains (e.g., domain 1, domain 2, and domain K).

The domain database 402 and the dialog system 404 may each be associated with and/or in communication with each other, by one or more communication methods, such as a computing network. In one example, the domain database 402 and the dialog system 404 may be controlled by an owner, customer, or technician/administrator associated with the computer system/server 12.

In one aspect, the computer system/server 12 may provide virtualized computing services (i.e., virtualized computing, virtualized storage, virtualized networking, etc.) to the domain database 402 and the dialog system 404. More specifically, the computer system/server 12 may provide virtualized computing, virtualized storage, virtualized networking and other virtualized services that are executing on a hardware substrate.

As depicted in FIG. 4, the domain database 402 may be a knowledge domain that may also include an ontology, knowledge base, and/or other data.

The knowledge domain of the domain database 402 may be a combination of domains, concepts, relationships between the domains or concepts, machine learning data, features, parameters, data, profile data, historical data, tested and validated data, or other specified/defined data for testing, monitoring, validating, detecting, learning, analyzing, monitoring, and/or maintaining data, concepts, and/or relationships between the concepts.

The domain database 402 may have multiple domains (e.g., domain 1, domain 2, and/or domain K). Each domain (e.g., domain 1, domain 2, and/or domain K) may include a template (e.g., problem instances template) with information, one or more links to one or more solvers, and/or other domain data and information (e.g., action schemas).

In one aspect, the domain database 402 may include one or more domain records and each record in the database corresponds to a given domain. Each domain record includes a) the template for defining problem instances in that particular domain, b) links to one or several problem solvers suitable for that domain, and c) optionally, additional domain information required by a solver.

In one aspect, the dialog system 404 may define one or more problem instances for multiple domains according to a problem instance template, identified user intent, links to one or more problem solvers associated with the multiple domains, or a combination thereof.

The dialog system 404 may provide a dialog plan to further define the one or more problem instances in response to user input. That is, the plan recognition component 410 may automatically compute/determine a dialog plan that can be used to define the problem instance, based on input that includes the problem instance template.

The learning component 408 may be a machine learning component for training and learning one or more machine learning models and also for learning, applying inferences, and/or reasoning pertaining to one or more domains, concepts, features, problems and relationships between the domains, or a combination thereof to the machine learning model for the dialog manager 406.

In one aspect, the learning component 408 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back-propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
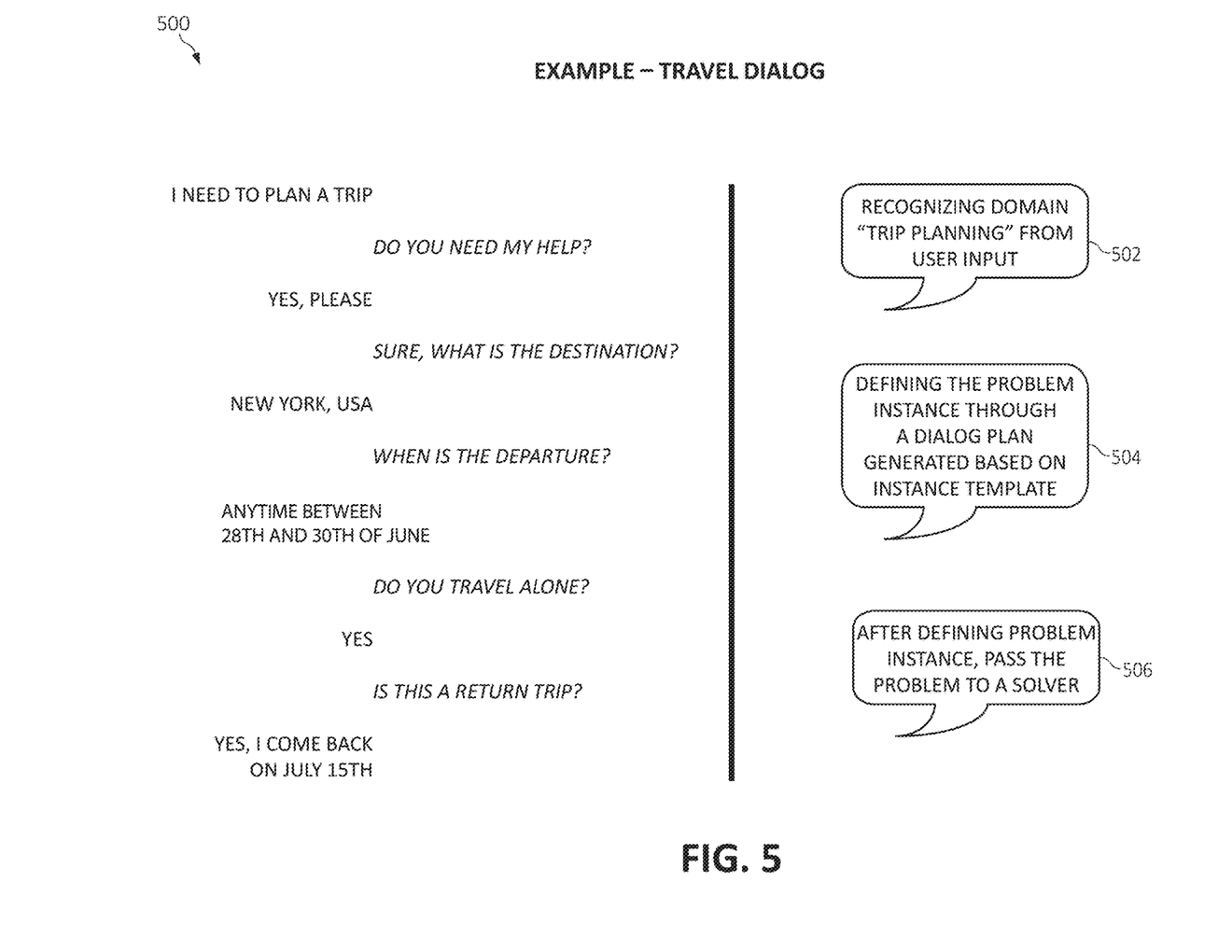
FIG. 5 is a diagram depicting an exemplary dialog using a dialog system for integrating multiple domain problem solving in a dialog system for a user in a computing environment in accordance with an embodiment of the present invention.
Figure 6:
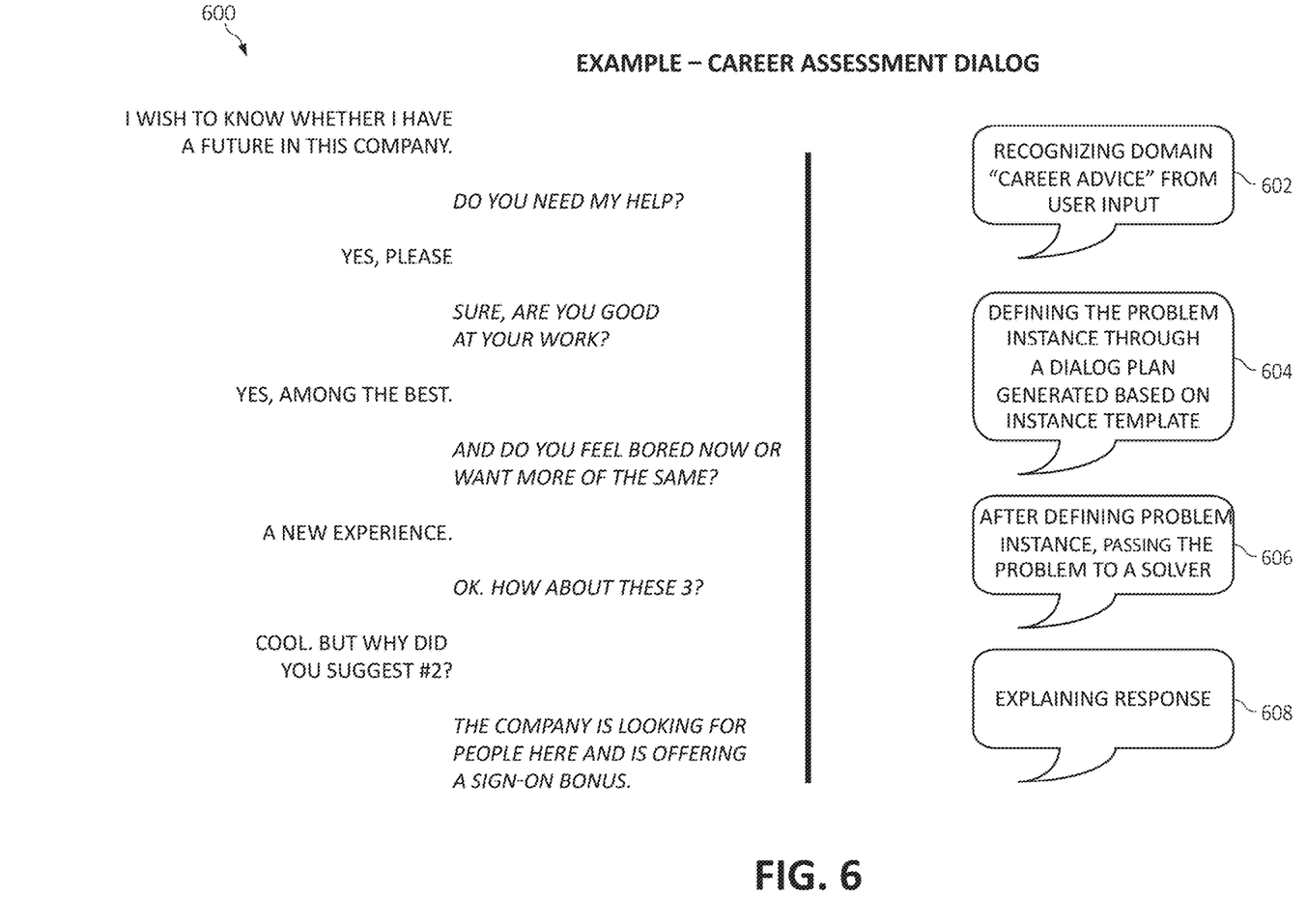
FIG. 6 is an additional diagram depicting an exemplary dialog using a dialog system for integrating multiple domain problem solving in a dialog system for a user in a computing environment in accordance with an embodiment of the present invention.

Turning now to FIGS. 5-6, exemplary dialog 500 and dialog 600 are depicted using a dialog system for integrating multiple domain problem solving in a dialog system for a user in a computing environment. That is, FIG. 5 is an example dialog between a user and a dialog system relating to a travel domain. FIG. 6 is an example dialog 600 between a user and a dialog system relating to a career assessment domain. As shown, the various blocks of functionality are depicted for the blocks' 500 and 600 relationships with each other and to show process flow. Additionally, descriptive information is also seen relating each of the functional blocks 500 and 600. As will be seen, many of the functional blocks may also be considered "modules" of functionality, in the same descriptive sense as has been previously described in FIGS. 1-4. With the foregoing in mind, the module blocks 500 and 600 may also be incorporated into various hardware and software components of a system for image enhancement in accordance with the present invention such as, for example, hardware and software components of FIGS. 1-4. Many of the functional blocks 500 or 600 may execute as background processes on various components, either in distributed computing components, or on the user device, or elsewhere.

As depicted in dialog 500, at block 502, a domain (e.g., a trip-planning domain) may be recognized from user input (which may be received from a computing system). For example, user input may indicate "I need to plan a trip" and the dialog system responds with "Do you need my help?"

At block 504, a problem instance may be defined through a dialog plan generated based on an instance template according to a series of interactive user-dialog system communication exchanges. For example, the user may reply stating "Yes, please." The dialog system may then ask "Sure, what is the destination?" The user input may state City A in Country A to which the dialog system may ask "When is the departure?" The user may respond "Anytime between the $28^{th}$ and $30^{th}$ of June." The dialog system 500 may then question the user "Do you travel alone?" and the user may reply "Yes." The dialog system can reply "Is this a return trip?" and the user may reply "Yes. I come back on July $15^{th}$." Thus, via a continuous dialog operation (e.g., one or more probing questions and answers), the problem instance may be defined through a dialog plan based on a problem instance template. At block 506 (or prior to, during, and/or after), after defining a problem instance, the problem may be passed to a solver.

As an additional example, consider the example of a career assessment dialog as illustrated in FIG. 6. As depicted in dialog 600, at block 602, a domain (e.g., a career advice domain) may be recognized from user input (which may be received from a computing system). For example, user input may indicate "I wish to know whether I have a future with this company" and the dialog system responds with "Do you need my help?"

At block 604, a problem instance may be defined through a dialog plan generated based on an instance template according to a series of interactive user-dialog system communication exchanges. For example, the user may reply stating "Yes, please." The dialog system may then ask "Sure, are you good at your work?" The user input may indicate "Yes, among the best." The dialog system may intuitively respond with additional probing questions such as, for example, "And do you feel bored now or want more of the same?" The user input may state "A new experience" to which the dialog system may then ask "Ok. How about these 3?" (e.g., three options/companies are provided to the user). Thus, at some point following block 604, at block 606 (or prior to, during, and/or after), after defining a problem instance, the problem may be passed to a solver.

The user may respond with a probing question to the dialog system "Cool. But why did you suggest #2?" The dialog system 600 may then answer the user "The company (e.g., suggestion #2) is looking for people here and is offering a sign-on bonus." Thus, as in block 608, the interactive dialog system can provide insights, evidence, and/or justifications to the user explaining one or more responses.

Figure 7:
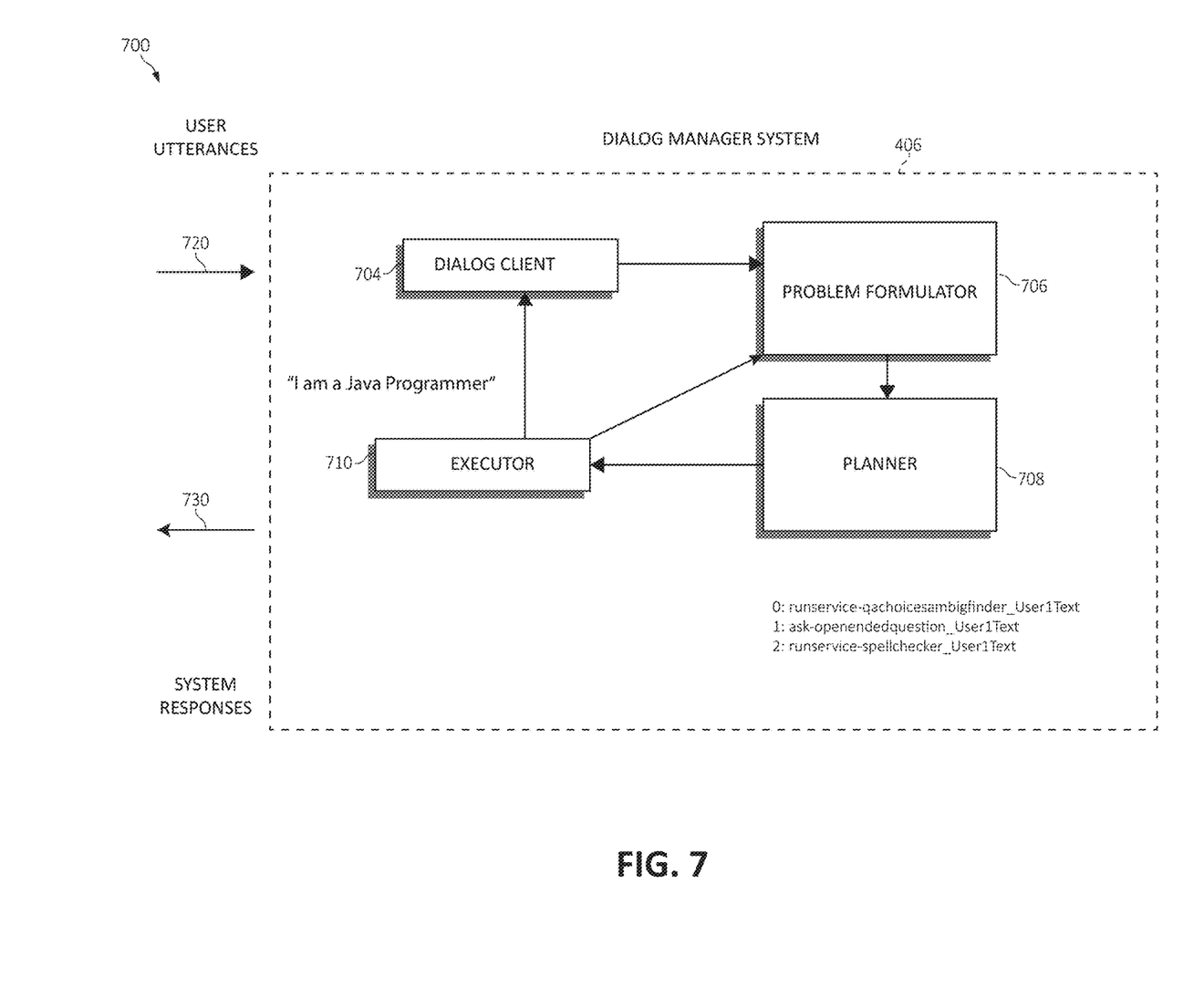
FIG. 7 is an additional block diagram depicting a dialog manager system according to an embodiment of the present invention.

Turning now to FIG. 7, a block diagram depicting dialog manager system 406 of FIG. 4 according to various mechanisms of the illustrated embodiments is shown. FIG. 7 illustrates workloads and functions for integrating multiple domain problem solving in a dialog system for a user using the dialog manager system 406 in a computing environment. As will be seen, many of the functional blocks may also be considered "modules" or "components" of functionality, in the same descriptive sense as has been previously described in FIGS. 1-4.

In one aspect, the dialog manager system 406 may include a dialog client 704, a problem formulator 706, a planner 708, and an executor 710. Thus, the dialog manager system 406 provides the ability to solve problem instances in multiple domains (e.g., domain 1, domain 2, and domain K of FIG. 4).

In one aspect, the dialog client 704 may receive user input (e.g., I am an application programmer) such as, for example, one or more user utterances 720 and recognize intent and meaning of the user utterances 720 using a machine learning component (e.g., an instance of IBM® Watson® such as Watson® Assistant and of IBM® and Watson® are trademarks of International Business Machines Corporation). That is, natural language processing (NLP) and artificial intelligence (AI) may be used to recognize intent and/or understand a meaning of the user utterances 720.

The dialog client 704 may also recognize a type of domain based on intent of the user from the user utterances 720 (e.g., using a pre-defined mapping from intents into domains). The problem formulator 706 may start and lead a dialog to construct a problem instance (e.g., formulate a user problem). The problem formulator 706 may also reason with a user based on a problem instance template, which may be stored in the dialog manager system 406. One or more variables may be defined for the one or more problem instances. The one or more variables may be assigned a predetermined value extracted from a user profile, a configuration file, or historical data associated with prior problem instances. Also, one or more dependencies between the one or more variables may be defined for the one or more problem instances. That is, the problem instance template may contain the dependencies between variables, specifying whether some of the variables need to be instantiated depending on the values of some other variables (e.g., if it is permissible to deliver a package to either the home or the work place of the user and the home address is previously known, there is no need to ask the user to enter the work address). In one aspect, known uncertainties may be listed by predicates and the problem formulator 706 and/or the planner 708 may reason (e.g., plan) to handle the cases reusing the given actions and plan templates (which may be associated with a plan template repository). That is, known uncertainties may mean one or more generic variables that need to be instantiated (i.e., values need to be assigned to the variables) to complete the definition of a problem instance to solve. The example, following, mentions a start date, a destination and the type of the trip (e.g., single/return/multi-hop) as unknown uncertainties.

Consider the follow example of travel planning. Trips may be one of one or more types: one-way, return and multi-hop. To book/schedule a return trip, a user needs to know a start location, a destination location, and the date and time of departure (or arrival) (and similar data for a return trip). There may be known uncertainties for the travel planning domain such as, for example, trip types, start day/time, and destination. One plan template may be a return trip that needs one or more specified or selected variables such as, for example, the start location, a destination, and the date and time of departure and/or arrival date and time. The plan may consist of two actions: 1) travel round-trip via air (start, destination, departure, arrival) and 2) fly (e.g., start, destination, departure, unknown arrival "?"), fly (destination, start, unknown departure "?"), and arrival (where the symbol "?" may represent an unknown). For a person requesting a dialog system to make a round-trip plan from airport "A" to airport "B" on April 1st and returning on April 15th, the plan template may be instantiated by replacing a start location with airport "A", destination by airport "B", departure by April 1st, and arrival by April 15th. The assignment of values to variables is also called binding.

When the problem instance is constructed using the problem formulator 706, a problem solver 708 (e.g., planner) may be used. The problem instance, which may include the instance and the domain knowledge, may be passed as input to problem solver 708. In one aspect, the domain knowledge may be domain-independent planning (e.g., Fast Downward) or domain-specific solvers (e.g., a specialized journey planning engine). It should be noted that a domain-independent planner (e.g., Fast Downward) may be a system that can solve different types of problems (as opposed to being specialized on one type of problem). In domain-independent planning, there may be generic input language, such as planning domain definition language ("PDDL"). As long as a problem can be expressed in PDDL, the problem may be approached, attacked, and/or solved with a domain-independent planner. For instance, the same planner can be capable of solving: a sliding-tile puzzle; a logistics problem about how to move a bunch of goods with a fleet of vehicles; and a trip planning problem. In contrast, specialized solvers work for only one application (e.g., only a solver specialized in planning a trip). The trade-off is that specialized solvers typically scale much better than domain-independent planners.

In one aspect, the domain knowledge may be a domain-independent planner (e.g., Fast Downward) or domain-specific solvers (e.g., a specialized journey planning engine). In one aspect, a domain-independent planner (e.g., Fast Downward) may be a system that can solve different types of problems (as opposed to being specialized on one type of problem). In domain-independent planning, there may be a generic input language such as, for example, PDDL. In one aspect, if a problem is able to be expressed in PDDL, the mechanisms of the illustrated embodiment may solve the problem with a domain-independent planner. For instance, the same planner can be capable of solving: a sliding-tile puzzle; a logistics problem about how to move a bunch of goods with a fleet of vehicles; and a trip planning problem. In contrast, specialized solvers work for only one application (e.g., a solver may be specialized for only planning a trip).

In one aspect, the problem solver 708 may provide an interactive dialog (e.g., one or more questions, answers, commentary, evidence, and the like) with a user (e.g., provide one or more choices, options, asking open ended questions, perform a spell check operation). For example, the following pseudocode provides various examples of a dialog:

```
0: runservice-qachoicesambigfinder_User1Text,
1: ask-openendedquestion_User1Text,
2: runservice-spellchecker_User1Text.
```

An executor 710 component may work in conjunction with and/or assist in performing one or more operations for the dialog client 704, the problem formulator 706, and/or the planner 708. The executor 710 may also return one or more solutions such as, for example, system responses 730, to a user. The executor 710 may be a REST based sequential action model and may terminate a plan on action failure. In one embodiment, the executor 710 may be a remote service that may be invoked, which can terminate the execution of a workflow at any stage that any action in it (workflow) fails. A REST application programming interface ("API") may include domain-specific services. The executor may also query a database for necessary user information. A plan may be translated to one or more workflows (e.g., business process execution language for web services "BPEL4WS") and a workflow engine may be used. The executor 710 may also return one or more solutions such as, for example, system responses 730, to a user. For example, after the problem formulator 706 infers the formulation of the problem instance through dialog via the dialog client 704, the inferred problem instance may be presented to the user via the executor 710, having confidence levels for parts of the instance so that the user can review the problem instance formulation, to enable more attention to assignments with a lower confidence value.

Figure 8:
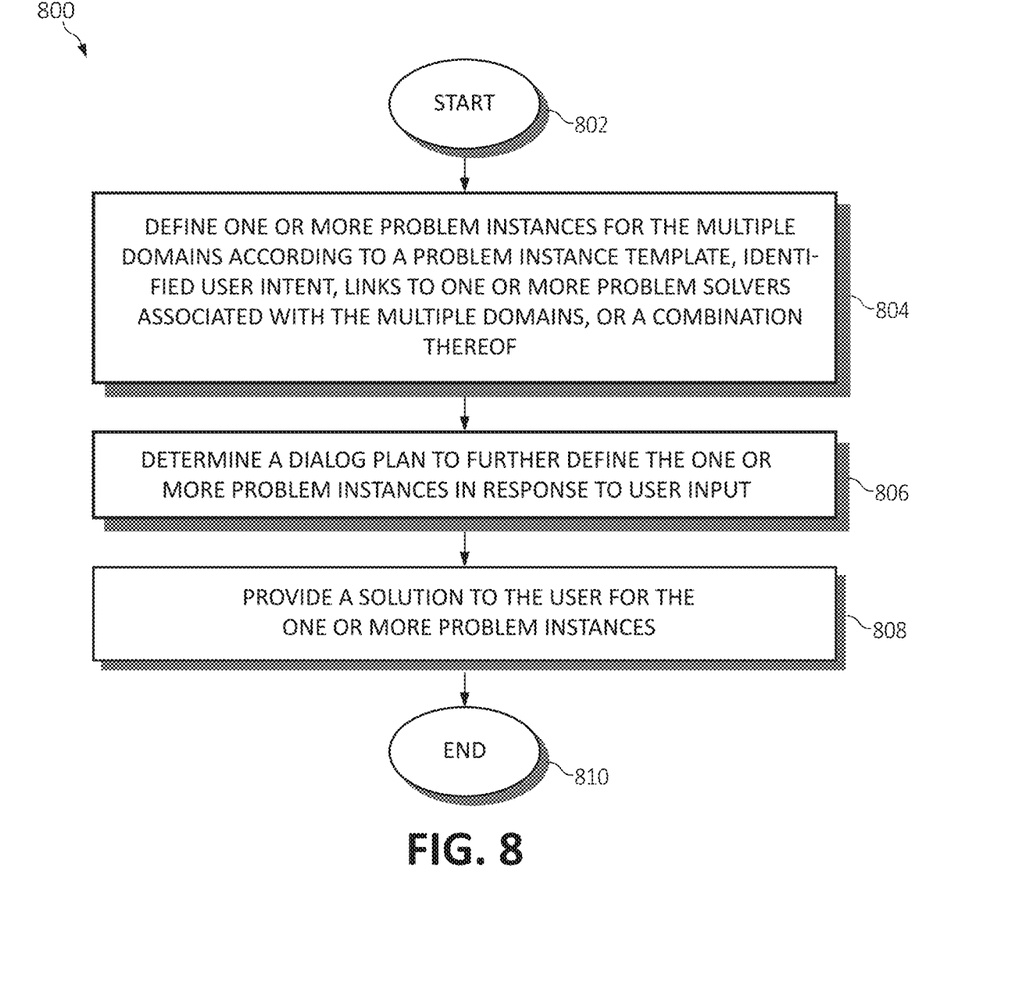
FIG. 8 is a flowchart diagram depicting an additional exemplary method for integrating multiple domain problem solving in a dialog system for a user in a computing environment in accordance with an embodiment of the present invention.

Turning now to FIG. 8, an additional method 800 is illustrated for integrating multiple domain problem solving in a dialog system for a user in a computing environment, in which various aspects of the illustrated embodiments may be implemented. The functionality 800 may be implemented as a method executed as instructions on a machine, where the instructions are included on at least one computer readable medium or on a non-transitory machine-readable storage medium.

The functionality 800 may start in block 802. One or more problem instances may be defined for multiple domains according to a problem instance template, identified user intent, links to one or more problem solvers associated with the multiple domains, or a combination thereof, as in block 804. A dialog plan may be determined to further define the one or more problem instances in response to user input, as in block 806. The dialog plan also minimizes a cognitive load during the formulation of the problem instance. That is, in reference to the cognitive load some queries require only a "yes" or "no" type answer, whereas other queries require more effort on the user and/or computing system. A solution may be provided to the user for the one or more problem instances, as in block 808. The functionality 800 may end in block 810.

In one aspect, in conjunction with and/or as part of at least one block of FIG. 8, the operations of 800 may include each of the following. The operations of 800 may further infer the one or more problem instances according to user input, assign a confidence level to one or more parts of the one or more problem instances, and/or add, delete, or update one or more domains of the multiple domains. One or more variables may be defined for the one or more problem instances. The one or more variables may be assigned a predetermined value extracted from a user profile, a configuration file, or historical data associated with prior problem instances. Also, one or more dependencies between the one or more variables may be defined for the one or more problem instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method, by a processor, integrating multiple domain problem solving in a dialog system for a user comprising:
   receiving, by the dialog system from the user, user input of dialog form;
   executing machine learning logic to generate, from the user input, a dialog model that defines one or more problem instances for multiple domains according to a problem instance template, an identified user intent, and links to one or more problem solvers associated with the multiple domains;
   executing the machine learning logic to determine a dialog plan to further define the one or more problem instances in response to the user input according to the dialog model, wherein determining the dialog plan includes utilizing the dialog model to minimize a cognitive load placed on the dialog system by formulating queries in the dialog plan in a semantic form that elicits a short-form response from the user; and
   generating a solution to the user for the one or more problem instances based on the user input associated with the dialog plan.

2. The method of claim 1, further including inferring the one or more problem instances according to the user input.

3. The method of claim 1, further including assigning a confidence level to one or more parts of the one or more problem instances.

4. The method of claim 1, further including adding, deleting, or updating one or more domains of the multiple domains.

5. The method of claim 1, further including defining one or more variables for the one or more problem instances.

6. The method of claim 5, further including assigning the one or more variables a predetermined value extracted from a user profile, a configuration file, historical data associated with prior problem instances, or a combination thereof.

7. The method of claim 1, further including defining one or more dependencies between the one or more variables for the one or more problem instances.

8. A system, for integrating multiple domain problem solving in a dialog system for a user in a computing environment, comprising:
   one or more processors with executable instructions that when executed cause the system to:
      receive, by the dialog system from the user, user input of dialog form;
      execute machine learning logic to generate, from the user input, a dialog model that defines one or more problem instances for multiple domains according to a problem instance template, an identified user intent, and links to one or more problem solvers associated with the multiple domains;
      execute the machine learning logic to determine a dialog plan to further define the one or more problem instances in response to the user input according to the dialog model, wherein determining the dialog plan includes utilizing the dialog model to minimize a cognitive load placed on the dialog system by formulating queries in the dialog plan in a semantic form that elicits a short-form response from the user; and
      generate a solution to the user for the one or more problem instances based on the user input associated with the dialog plan.

9. The system of claim 8, wherein the executable instructions further infer the one or more problem instances according to the user input.

10. The system of claim 8, wherein the executable instructions further assign a confidence level to one or more parts of the one or more problem instances.

11. The system of claim 8, wherein the executable instructions further add, delete, or update one or more domains of the multiple domains.

12. The system of claim 8, wherein the executable instructions further define one or more variables for the one or more problem instances.

13. The system of claim 12, wherein the executable instructions further assign the one or more variables a predetermined value extracted from a user profile, a configuration file, historical data associated with prior problem instances, or a combination thereof.

14. The system of claim 8, wherein the executable instructions further define one or more dependencies between the one or more variables for the one or more problem instances.

15. A computer program product for, by one or more processors, integrating multiple domain problem solving in a dialog system for a user in a computing environment, the computer program product comprising a non-transitory computer-readable storage medium having computer-readable program code portions stored therein, the computer-readable program code portions comprising:
   an executable portion that receives, by the dialog system from the user, user input of dialog form;

an executable portion that executes machine learning logic to generate, from the user input, a dialog model that defines one or more problem instances for multiple domains according to a problem instance template, an identified user intent, and links to one or more problem solvers associated with the multiple domains;

an executable portion that executes the machine learning logic to determine a dialog plan to further define the one or more problem instances in response to the user input according to the dialog model, wherein determining the dialog plan includes utilizing the dialog model to minimize a cognitive load placed on the dialog system by formulating queries in the dialog plan in a semantic form that elicits a short-form response from the user; and an executable portion that generates a solution to the user for the one or more problem instances based on the user input associated with the dialog plan.

16. The computer program product of claim 15, further including an executable portion that infers the one or more problem instances according to the user input.

17. The computer program product of claim 15, further including an executable portion that assigns a confidence level to one or more parts of the one or more problem instances.

18. The computer program product of claim 15, further including an executable portion that adds, deletes, or updates one or more domains of the multiple domains.

19. The computer program product of claim 15, further including an executable portion that:

defines one or more variables for the one or more problem instances; or assigns the one or more variables a predetermined value extracted from a user profile, a configuration file, historical data associated with prior problem instances, or a combination thereof.

20. The computer program product of claim 15, further including an executable portion that defines one or more dependencies between the one or more variables for the one or more problem instances.

* * * * *